Nov. 13, 1928.  H. SENGEBUSCH  1,691,256
SWITCHING MECHANISM
Original Filed Aug. 5, 1925   2 Sheets-Sheet 1
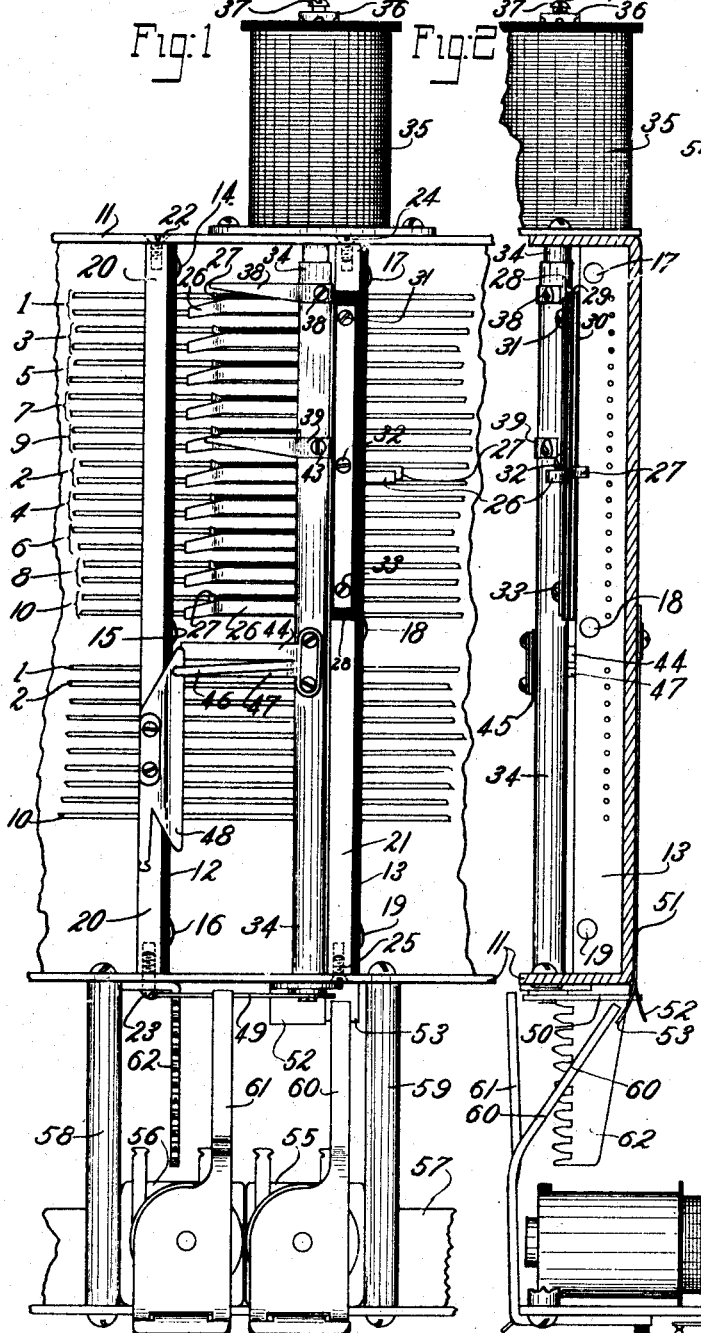
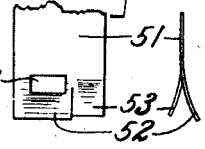
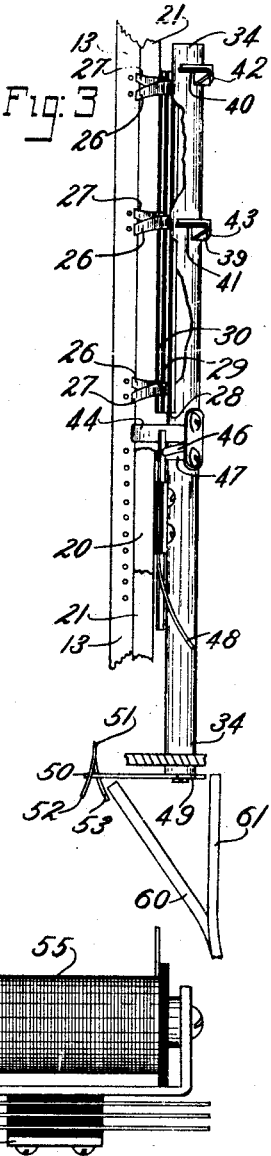
Inventor
Hans Sengebusch Nov. 13, 1928.

H. SENGEBUSCH 1,691,256

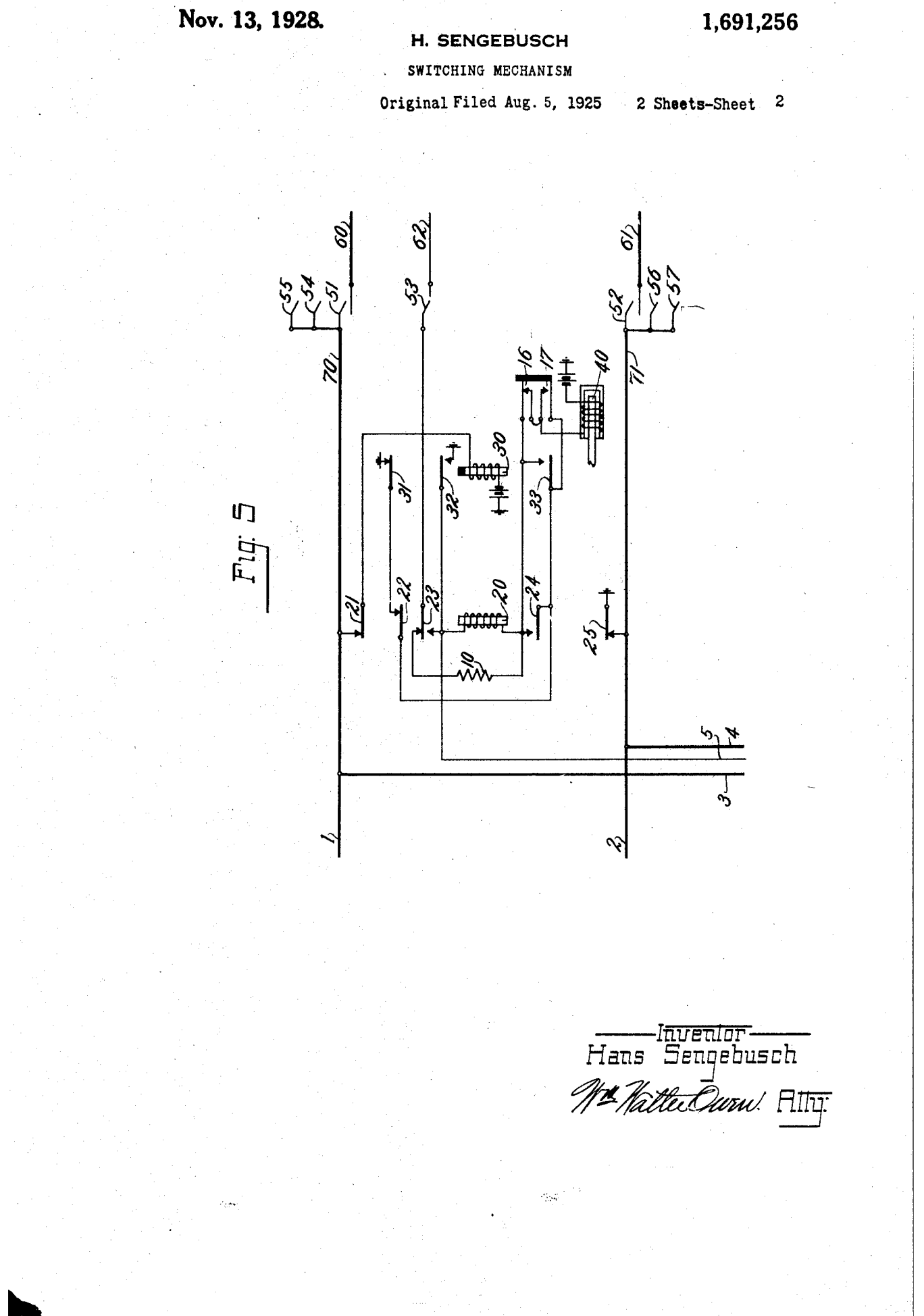

SWITCHING MECHANISM

Original Filed Aug. 5, 1925   2 Sheets-Sheet 2

Inventor
Hans Sengebusch

Patented Nov. 13, 1928.

1,691,256

UNITED STATES PATENT OFFICE.

HANS SENGEBUSCH, OF CHICAGO, ILLINOIS, ASSIGNOR TO AUTOMATIC ELECTRIC INC., OF CHICAGO, ILLINOIS, A CORPORATION OF DELAWARE.

SWITCHING MECHANISM.

Application filed August 5, 1925, Serial No. 48,247 Renewed November 28, 1927.

The present invention, generally stated, relates to a novel switching mechanism and is, more particularly, concerned with a new and improved type of non-numerical trunking switch for use in automatic telephone systems.

It will be well to first recall the operations of the usual rotary non-numerical switching mechanism, so that the description of my improved switch which serves the same purpose, but operates upon different principles, may be readily comprehended.

Such a switch as intimated above is described on pages 28 and 61, and illustrated in Figs. 33, 34, and 91 of the book entitled "Automatic Telephone Practice," by Harry E. Hershey, fourth edition, published by the author. In view of the fact that such switching mechanism is well known in the art, I shall limit myself to but a cursory account thereof.

Referring now to Fig. 34 of the above publication, it will be recalled that the apparatus, known as a rotary line switch, is provided individual to a subscriber's line and serves to connect a calling subscriber automatically to a switch adapted to operate under directive control of the usual calling device. This is accomplished by an automatic rotary movement of a set of wipers which have access to trunk lines terminating in numerical switches. The automatic movement is initiated by the subscriber removing the receiver from the hook in order to extend a call. Upon the wipers encountering an idle trunk line, the rotary movement terminates and the calling subscriber's line is connected through to the seized numerical switch, whereupon the connection is extended in the usual manner under the calling party's control by means of the calling dial. Upon the termination of a call, the switch either returns to its normal position with the wipers withdrawn from the trunk lines, or the switch is left in the position with the wipers engaging the terminals of the trunk line last used, depending upon the circuits adopted for operating the switch.

As has been stated above my invention is concerned with a non-numerical trunking switch serving the same purpose as the rotary line switch referred to, but operating on entirely different principles.

The chief object of my invention is to simplify the manufacture of the mechanism and to improve its operating qualities, tending to reduce the cost of the switch and to reduce maintenance expenses to a minimum without impairing the reliability of its operations.

I shall now discuss briefly the various features of my invention, so that the detailed description, which is to follow, may be easily understood and fully appreciated.

Instead of locating the terminals of the trunk lines in radially arranged semi-circular rows in banks, one bank for each switch, and using insulated flexible bank wiring between the adjoining switches, I employ non-insulated conductors extending horizontally in a single vertical plane common to a plurality of switches, i. e., common to the switches mounted in a row. The individual terminal banks are thereby entirely eliminated. Considering the complicated manufacturing process of the terminal banks and the great number of soldering points necessary for connecting the banks in a row by means of flexible, insulated conductors, it will be realized that my arrangement presents a decided advantage.

The line wipers are arranged stationary with sectional extensions located opposite of but out of engagement with the bare wire trunk conductors. The private wiper, and two projecting arms adapted to be located opposite the sections of the line wipers, are mounted on a vertically movable shaft which is kept in normal position suspended by a catch with the private wiper positioned above the first, i. e., the uppermost test conductor of a trunk.

Upon a subscriber initiating a call, the shaft will be released and carried vertically downward by gravitational force. The test or private wiper will thereby brush over the test conductors, while the two projecting arms, which are also mounted upon the shaft, are advanced opposite the respective sections of the line wipers. When an idle trunk is found, the shaft will receive a partial axial motion and complete the connection between the line and the trunk conductors by pressing one of the projecting arms against the proper line wiper sections, thereby forcing the sections of the line wipers into engagement with the line conductors corresponding to the seized test conductor.

The shaft extends at its upper end into a solenoid provided to move it into its normal position at the termination of the call. The solenoid is provided with an air valve for regulating the downward speed of the shaft.

The above and other objects and features will appear clear from the following detailed account of the apparatus, reference being had to the accompanying two sheets of drawings which form a part of this specification.

In Fig. 1, I have shown a front view of the switch mechanism, all parts being shown in normal or non-operated position;

Fig. 2 illustrates a side view of the switch shown in Fig. 1;

Fig. 3 is a sectional side view illustrating especially the relation of the wipers to the bare wire trunk terminals and the method of operating the line wipers into engagement with the line terminals of the trunk;

Fig. 4 illustrates a detailed view of a catch spring holding the shaft in normal position; and Fig. 5 shows a circuit diagram for operating the switch.

Referring now to Figs. 1-4, inclusive, it will be seen that the switch mechanism is mounted on a U-shaped rack designated through the numeral 11. I have only shown a section of the rack with all the apparatus belonging to one switch, but it will be understood that such rack represents the support of an entire row or group of switches, each mounted in the manner shown in the drawings.

The terminals of the conductors of the trunk lines accessible to the switches in a row, consist of bare wires extending horizontally throughout the entire length of the supporting rack and are connected to the outgoing cable in some convenient manner, for example, by means of terminal strips attached to the rack. The terminals located in the upper part of the drawing and designated 1-10, inclusive, with the odd numbers positioned above the even ones, are the line terminals of the trunk lines, while the test terminals are located below and in numerical order. Thus, trunk number 1 has its two line terminals located at the top of the line terminal group, and the corresponding test terminal is located, likewise, at the top of the test terminal group. Trunk number 2, however, has its line terminals located after trunk number 9, while its test terminal follows the test terminal of trunk 1 in numerical order. The terminals are supported by insulating strips 12 and 13 which are riveted at points 14-19, inclusive, to square shaped bars 20 and 21. These bars are secured to the U-shaped rack by means of countersunk screws 22, 24, and 25, and round-head screw 23, the latter of which serves also for supporting a comb-like member extending vertically downward, the purpose of which will appear later on.

The wipers 26 and 27 are insulated from each other and also from the bar 21 by means of insulators 28, 29, and 30, and fastened to the bar 21 by means of screws 31, 32, and 33. It will be seen that the line wipers are merely stationary switching members having projections extending in pairs in front of but out of engagement with the line terminals of a trunk. By means of these projections the line wipers 26 and 27 can be brought into engagement with any one of the line conductors, or, in other words, the stationary wipers are adapted to selectively engage any one of a plurality of stationary trunks by means of projections individual to the trunks or trunk conductors.

It should be observed that the term "wiper" applied to the switching members 26 and 27 may be objected to on the ground that the term suggests the usual brushing or wiping function, whereas the switching members in the present switch are stationary. However, the term has been adopted, or, rather to say, retained for convenience, because the purpose of the switching members is identical to that of the line wipers in the usual switch.

In front of the wipers and terminals there is located a vertically movable shaft, designated 34, and extending at both ends through the limbs of the rack 11. At its upper end, the shaft extends into a solenoid 35, which is closed by a cap-valve 36. The latter is provided with a threaded opening holding a screw 37, and with a number of air holes extending from the circular surface of the cap towards the center, and indicated by semi-circles. It may be pointed out now, and will be seen more clearly later on, that the speed of the vertical downward movement of the shaft may be regulated by means of screw 37. Tightening of the screw will result in a closure of the air holes which will amount to a more or less complete obstruction of the air passage. The shaft will accordingly assume a slow downward motion.

Again returning to the arrangement of the line terminals, it will be recalled that the odd terminals are located above the even ones, and that sections of the line wipers are positioned opposite of but out of engagement thereto. In order to connect the line wipers with a certain selected trunk, the wiper sections individual to that trunk must therefore engage their terminal conductors. This is accomplished, upon the seizure of a trunk line, by means of one of the two projecting arms 38 or 39, mounted on the movable shaft 34 by screws 42 and 43, respectively. It will be seen from the drawings, which show the switch in resting position, that arm 38 is positioned above the terminals of trunk number 1, while arm 39 is directly opposite terminals of trunk number 9. It will be obvious without elaborate explanantion, that arm 38 is provided for engaging the line wiper sections of the odd terminals, while arm 39 serves to engage the even ones. If a certain trunk, for example, trunk number 5 is tested free, the arm 38 will be positioned at the moment of testing, opposite the line wiper sections individual to terminals of trunk number 5, which arm 39 is positioned between line wiper sections of trunks 4 and 6. The shaft will now, at the instance of testing, receive an axial motion just sufficient to turn the arms 38 and 39 towards the wiper sections, and arm 38 positioned opposite the sections belonging to the terminals of trunk number 5, will force the line wiper sections into engagement with the terminals. The movement of arm 39 is, at this time, without any effect. Both arms are provided at their ends with insulating washers 40 and 41 which engage the upper sections of wiper 26. The sections of wiper 27 are insulated from the sections of wiper 26 by insulator 29 as indicated in the drawing. The operations will appear more clearly as the description progresses.

The test wiper, designated through the numeral 44 and provided with two extensions 46 and 47, is also mounted on the movable shaft 34, and insulated therefrom by an insulator 45. The purpose of these extensions is to feed current to the test wiper. Mounted on the bar 20 and insulated therefrom is the feed terminal member 48. The test wiper is, in normal position, out of engagement with the test terminal. Upon the shaft executing its hunting movement, i. e., upon a subscriber initiating a call and causing the shaft to move vertically downward by force of gravity, the test wiper will successively test the terminals of the test conductors of the trunks, and the two extensions will remain in engagement with the feeding terminal, while the projecting arms 38 and 39 will be positioned opposite the line wiper sections as described previously.

At the lower end of the shaft 34, there is provided an angular member, having its limbs designated through the numerals 49 and 50, respectively. A flat spring 51, provided with an opening 54, is secured to the back of the supporting rack 11. This spring is split at its lower end and the two parts 52 and 53 of the spring are bent in opposite directions as shown in the drawings. The purpose of this spring is to catch the limb 50 of the angular member secured to the shaft and to hold the shaft suspended in normal position with limb 50 extending through the opening 54 as shown.

Two relays, the line relay 55 and the switching relay 56, are shown in the lower portion of the drawings, Figs. 1 and 2. The relays are mounted on an angular frame 57 fastened to the rack 11 by bars 58 and 59. The armature 60 of relay 55 is adapted to operate spring 51 and to release thereby the shaft 34 by removing the suspension catch from the limb 50 of the angular member attached to the shaft. This relay will be operated whenever a call is initiated at the substation, and, accordingly, the shaft will commence with its vertical downward movement as described.

Relay 56 is the switching relay of the apparatus and will energize upon the test wiper encountering an idle trunk line. Upon operating, relay 56 attracts its armature 61 which is located in such a manner relative to the limb 49 of the angular member associated with shaft 34, as to move it towards the comb-like locking structure 62 and to force member 49 into engagement with one of the teeth thereof. Each of the teeth of the lock 62 corresponds, of course, to a certain trunk line. Member 49, being attached to shaft 34 participates in the vertical downward motion of the latter, and moves in front of but out of engagement with the lock 62. When the test wiper finds an idle trunk, the switching relay 56 energizes and moves member 49 into the tooth of the lock 62 which corresponds to the seized trunk line. The further downward movement is prevented and the shaft is thereby given a partial rotary twist which causes arm 38 or 39, as the case may be, to move towards the proper sections of the line wipers causing them to engage the line terminals of the trunk line. Relay 56 remains energized throughout the duration of the call, locking the shaft in operated position.

Upon the subscribers hanging up their receivers at the termination of the conversation, relay 56 deenergizes, allowing the shaft to restore radially to its normal position, withdrawing member 49 from lock 62 and arms 38 and 39 from the sections of the line wipers, thereby breaking connection between the line terminals and the wiper section individual to that trunk line. The solenoid 35 energizes thereupon and moves the shaft 34 vertically up into its resting position. The limb 50 takes hold in the opening 54 of the catch spring 51 and the apparatus is ready for a subsequent call, with the shaft suspended as shown in the drawings.

The circuits for controlling the various operations of the switching mechanism described above will, of course, require contacts operated by the two relays 55 and 56 and also off normal contacts denoting the condition of the switch whether busy or idle. I have indicated at 63 the method of mounting a set of contacts upon the relays. The combination of contacts on the set shown is in no way indicative of the actual conditions which may be required in practice but shall only illustrate the method of mounting. Off normal contacts may be attached in any suitable combination and position which readily suggests itself, for example, in back of the supporting rack, extending downwards and adapted to be engaged by the projecting arm 50 extending through the opening on catch spring 51, or they may be attached to one of the circular bars 58 or 59, by means of a clamp, and extend horizontally in front of the armatures 60 and 61 where they may be operated by the locking member 49.

Referring now to Fig. 5 which shows a circuit diagram for operating the switch. It will be seen that the branches 1 and 2 of a subscriber's telephone line terminate at points 70 and 71 directly in the two line wipers which are divided into sections such as 51—52, 54—56, and 55—57, each section being permanently positioned opposite of, but out of engagement with the terminals of the respective trunk lines accessible to the switch. I have only shown the two line terminals 60 and 61, and the corresponding test terminal 62 of one trunk line, accessible to the switch over the line wiper sections 51 and 52.

When the subscriber initiates a call by removing the receiver from the switchhook, he closes the circuit of the line relay 30 by way of armatures 21 and 25 of the switching relay 20. The line relay 30, upon energizing, opens the release circuit at its armature 31, connects ground to the switching relay 20 at its armature 32, thereby also busying the switch against incoming calls from the connector, by grounding the private normal conductor 5; and prepares the circuit of the switching relay 20 by closing its armature 33. The shaft starts on its vertical downward movement due to the armature of relay 30 engaging the catch-spring and releasing the shaft as described previously, and test wiper 53 engages the terminal of the first trunk line. The shaft operates its off normal springs, opening contact 16 and closing contact 17. The latter completes the circuit of the switching relay 20 in series with the solenoid 40. The solenoid can not operate in series with the high resistance winding of switching relay 20. The operation of relay 20, however, depends upon the busy or idle condition of the first trunk line. If idle, the switching relay 20 will operate immediately and prevent any further movement by locking the shaft. For the purpose of explanation, I shall assume that the first trunk is busy.

Wiper 53 encounters ground at the test terminal of the busy trunk and short circuits the switching relay 20. The circuit may be traced from ground at test wiper 53, armature 23 and its resting contact, resistance 10, winding of switching relay 20, and armature 32 and its working contact to ground. It should be observed at this point that the ground encountered by the test wiper 53 is also propagated to the winding of the solenoid 40 and to battery by way of armature 33 and its working contact, and off normal contact 17, which was closed immediately upon the shaft starting its hunting movement.

Solenoid 40, however, does not energize at this time, because of the high resistance 10 connected in series with its winding. The downward movement of the shaft continues, therefore, the test wiper brushing over the test terminals in succession, until an idle trunk is found.

Assuming the trunk shown in the drawing, comprising line conductors 60 and 61, and test conductor 62, to be idle, there will be no ground on the latter, and the switching relay 20, being no longer short circuited, operates over the following circuit: From ground by way of working contact and armature 32, winding of switching relay 20, armature 33 and its working contact, off normal contact 17, winding of the solenoid 40 to battery. The switching relay 20 energizes in this circuit, but the solenoid 40 will not operate due to the high resistance of the switching relay.

Upon energizing, the switching relay 20 attracts its armature and moves the locking member 49 into engagement with the tooth of the locking comb, preventing further movement of the shaft, as explained, and twisting the shaft radially to cause the projecting arm positioned opposite line wiper sections 51 and 52 to move towards the sections and to force them into engagement with the line terminals 60 and 61. At its armatures 21 and 25, the switching relay disconnects the line relay. The line relay is provided with a copper slug making it slow to pull up and producing also retarded release. The first is utilized as a precaution against premature energization in incoming calls, as will be seen later, and slow release serves to keep ground connected to the release trunk at armature 32 for a sufficient period until the seized switch has connected ground to the test terminal 62. At its armature 22, the switching relay opens a point in the operating circuit of the solenoid 40; armature 23 connects the test wiper 53 directly to the winding of the switching relay and to the private normal conductor 5; and armature 24 completes a locking circuit for the switching relay 20, which extends from battery over winding of the solenoid 40, off normal contact 17, armature 24 and its working contact, winding of switching relay 20, working contact and armature 23, wiper 53 and test conductor 62 to ground connected in the usual manner to the test conductor of the seized switch before the line relay 30 has had time to retract its armature 32. The switching relay remains energized throughout the duration of the conversation.

Upon the subscribers hanging up their receivers at the termination of the call, ground is disconnected from the release trunk conductor, and the switching relay 20 deenergizes. At its armature 22, the switching relay completes the circuit for the solenoid 40 by connecting direct ground to its winding.

This circuit includes armature 31 of the line relay, armature 22 of the switching relay, and off normal springs 17. The solenoid 40 energizes and restores the switch shaft to normal position as has been explained in detail. Shortly before assuming normal position, the shaft will operate its off normal springs, opening 17 and closing 16. The switch is now ready for subsequent use.

Incoming calls from the connector arrive over the normal conductors 3, 4, and 5, and cause the following operations: Ground is connected to the test conductor 5 and causes the energization of the switching relay 20 by way of normally closed off normal springs 16 and over winding of the solenoid 40 to battery. The solenoid, as will be remembered, can not operate in series with the switching relay 20, but the latter energizes and disconnects the line relay 30 in an obvious manner to prevent its operation and consequent initiation of the hunting movement of the shaft. The line relay, as will be recalled, is slow to pull up to safeguard against any possibility of premature energization.

While I have shown the principles of my invention incorporated in a line switch, it will be realized that the invention is capable of more or less application and use in other kinds of switching apparatus, and that I do not want to be limited to the precise manner of carrying out my invention, as shown and explained in the foregoing description. What I consider new and desire to have protected by Letters Patent shall be pointed out in the following claims.

What is claimed is:

1. An automatic switching mechanism having a vertically and radially movable shaft, a pair of stationary wipers provided with sectional extensions, terminals arranged in a vertical plane accessible to said wipers over said extensions but normally out of engagement therewith, means for moving said shaft vertically to select certain of said terminals, and means for then moving said shaft radially to cause certain ones of said extensions to engage the selected terminals.

2. An automatic switching mechanism having a vertically and radially movable shaft, a pair of stationary wipers provided with sectional extensions, terminals arranged in a vertical plane accessible to said wipers over said extensions but normally out of engagement therewith, means for moving said shaft vertically to select certain of said terminals, means for then moving said shaft radially to cause certain ones of said extensions to engage the selected terminals, and means for locking the shaft in operated position.

3. An automatic switching mechanism having a movable shaft, a pair of wipers, terminals arranged in a vertical plane accessible to said wipers but normally out of engagement therewith, means for moving said shaft exclusive of said wipers to select certain of said terminals, and means associated with said shaft for then moving said wipers into engagement with the selected terminals.

4. An automatic switching mechanism having a movable shaft, a pair of wipers, terminals arranged in a vertical plane accessible to said wipers but normally out of engagement therewith, means for moving said shaft exclusive of said wipers to select certain of said terminals, means including said shaft for then moving said wipers into engagement with the selected terminals, and means for locking said wipers in operated position.

5. An automatic switching mechanism, having a vertically and axially movable shaft, terminals arranged in a vertical plane, a pair of wipers provided with a plurality of switching members, each of said members corresponding to a certain terminal and located opposite thereto but out of engagement therewith, means for moving said shaft vertically to select certain of said terminals, and means including said shaft for then connecting the selected terminals with the corresponding switching members.

6. An automatic switching mechanism having a vertically and axially movable shaft, terminals arranged in a vertical plane, a pair of wipers provided with a plurality of switching members, each of said members corresponding to a certain terminal and located opposite thereto but out of engagement therewith, means for moving said shaft vertically to select certain of said terminals, means for then moving said shaft axially to connect the selected terminals with the corresponding switching members, and means for locking the shaft in operated position.

7. An automatic switching mechanism having a vertically and axially movable shaft, terminals arranged in a vertical plane, a pair of wipers provided with a plurality of switching members, each of said members corresponding to a certain terminal and located opposite thereto but out of engagement therewith, means for moving said shaft vertically to select certain of said terminals, and electromagnetic means operative upon seizure of the selected terminals for moving said shaft axially to connect the selected terminals with the corresponding switching members.

8. An automatic switching mechanism having a vertically and axially movable shaft, terminals arranged in a vertical plane, a pair of wipers provided with a plurality of switching members, each of said members corresponding to a certain terminal and located opposite thereto but out of engagement therewith, means for moving said shaft vertically to select certain of said terminals, electromagnetic means operative upon seizure of the selected terminals for moving said shaft axially to connect the selected terminals with the corresponding switching members, and mechanical means for locking the shaft in operated position.

9. An automatic switching mechanism having a vertically and axially movable shaft, terminals arranged in a vertical plane, a pair of wipers provided with a plurality of switching members, each of said members corresponding to a certain terminal and located opposite thereto but out of engagement therewith, means for moving said shaft vertically to select certain of said terminals, and electro-magnetic means operative upon and during the seizure of the selected terminals for moving said shaft axially to connect the selected terminals with the corresponding switching members and for locking said shaft in operated position.

10. An automatic switching mechanism having a vertically and axially movable shaft, terminals arranged in a vertical plane, a pair of wipers provided with a plurality of switching members, each of said members corresponding to a certain terminal and located opposite thereto but out of engagement therewith, means for moving said shaft vertically to select certain of said terminals, electromagnetic means operative upon and during the seizure of the selected terminals for moving said shaft axially to connect the selected terminals with the corresponding switching members, and mechanical means for locking said shaft in operated position.

11. An automatic switching mechanism having a shaft vertically movable by gravitational force, a plurality of terminals arranged in a vertical plane, a plurality of conductively connected switching members, each individual to a certain terminal but out of engagement therewith, electromagnetic means for initiating the vertical movement of said shaft to select certain of said terminals, and means for then moving said shaft radially to operate the switching members individual to the selected terminals for establishing connection therewith.

12. An automatic switching mechanism having a shaft vertically movable by gravitational force, a plurality of terminals arranged in a vertical plane, a plurality of conductively connected switching members, each individual to a certain terminal and located opposite thereto but out of engagement therewith, means for initiating the vertical movement of said shaft to select certain of said terminals, and electromagnetic means for then moving said shaft radially to move the switching members individual to the selected terminals into engagement therewith and for locking said members in operated position.

13. An automatic switching mechanism having a shaft vertically movable by gravitational force, a plurality of terminals arranged in a vertical plane, a plurality of conductively connected switching members, each individual to a certain terminal and located opposite thereto but out of engagement therewith, means for initiating the vertical movement of said shaft to select certain of said terminals, electromagnetic means for then moving said shaft radially to move the switching members individual to the selected terminals into engagement therewith, and mechanical means for locking said members in operated position.

14. An automatic switching mechanism having a shaft vertically movable by gravitational force, a plurality of terminals arranged in a vertical plane, a plurality of conductively connected switching members, each individual to a certain terminal, means for initiating the vertical movement of said shaft to select certain of said terminals, means including a solenoid for regulating the speed of the vertical movement of said shaft, and means operative upon certain terminals being selected, for moving said shaft radially to cause the switching members individual to the selected terminals to establish connection therewith.

15. An automatic switching mechanism having a shaft vertically movable by gravitational force, a plurality of terminals arranged in a vertical plane, a plurality of conductively connected switching members, each individual to a certain terminal but out of engagement therewith, a solenoid, means for initiating the vertical movement of said shaft to select certain of said terminals, means associated with said solenoid for controlling the speed of said vertical movement, means operative for moving the switching members individual to said terminals into engagement therewith and again operative for withdrawing said switching members from said terminals and for operating said solenoid to move said shaft into normal position.

16. An automatic switching mechanism having a shaft vertically movable by force of gravity and locked in normal position by an angular lever engaging a locking spring, a plurality of terminals arranged in pairs in a vertical plane, a plurality of conductively connected switching members, arranged in pairs, each pair being individual to a certain pair of terminals but out of engagement therewith, a solenoid, means for removing said locking spring to initiate the vertical movement of said shaft to select a pair of terminals, means including an air valve for adjusting the speed of said vertical movement, means including said shaft and said angular lever for moving the switching members individual to the selected terminals into engagement therewith and again operative for withdrawing said switching members from said terminals and for operating said solenoid to move said shaft into normal position with said angular member engaging said locking spring.

17. An automatic switching mechanism having a shaft vertically movable by force of gravity and provided with a test wiper and a plurality of switching arms, terminals of trunk lines provided for the transmission of electric energy, one test terminal and two line terminals comprising a trunk line, said test terminals being arranged in a vertical plane in numerical order and accessible to said test wiper, said line terminals being arranged in pairs in a vertical plane separated from said test terminals, a plurality of conductively connected switching members arranged in pairs, each pair being individual to a pair of line terminals but out of engagement therewith, means for initiating the vertical movement of said shaft to select the terminals of a certain trunk line by means of said test wiper, and means for moving the pair of switching members individual to the line terminals of the selected trunk line into engagement therewith only when needed for transmitting energy thereover.

18. In an automatic remotely controlled switching apparatus, a plurality of terminals of trunk lines provided for the transmission of electric energy, said terminals being arranged in pairs in a vertical plane, switching members individual to each terminal pair but out of engagement therewith, a shaft vertically movable by force of gravity to select terminals of a certain trunk line, and axially movable to cause the switching members individual to the selected terminals to move into engagement therewith only when needed for transmitting energy thereover.

19. In an automatic remotely controlled switching apparatus, a plurality of terminals of trunk lines provided for the transmission of electric energy, said terminals consisting of non-insulated conductors common to a plurality of switching apparatus and being arranged in pairs extending horizontally in a vertically plane, switching members individual to each pair of terminals permanently located opposite thereto but out of engagement therewith, a shaft vertically movable by force of gravity to select terminals of a certain trunk line, and axially movable to cause the switching members individual to the selected terminals to move into engagement therewith only when needed for transmitting energy thereover.

20. In an automatic remotely controlled switching apparatus, a plurality of terminals of trunk lines provided for the transmission of electric energy, each trunk line comprising one test and two line terminals, said terminals consisting of bare conductors common to a plurality of switching apparatus and extending horizontally in a vertical plane, the test terminals being arranged in numerical order and said line terminals being separated from said test terminals and arranged in pairs, the pairs of the odd numbered trunk lines preceding the pairs of the even numbered trunk lines, conductively connected switching members individual to each pair of line terminals permanently located opposite thereto but out of engagement therewith, a vertically and radially movable shaft, means for moving said shaft vertically to select a certain trunk line, and means for moving said shaft radially to cause the switching members individual to the pair of line terminals of the selected trunk line to move into engagement therewith only when needed for transmitting energy thereover.

21. In an automatic remotely controlled switching apparatus, a plurality of terminals of trunk lines provided for the transmission of electric energy, said terminals being arranged in pairs in a vertical plane, switching members individual to each terminal pair but out of engagement therewith, a shaft vertically movable by force of gravity to select terminals of a certain trunk line, and axially movable to cause the switching members individual to the selected terminals to move into engagement therewith only when needed for transmitting energy thereover, and remotely controlled means for restoring the apparatus to normal position.

22. In an automatic remotely controlled switching apparatus, a plurality of terminals of trunk lines provided for the transmission of electric energy, said terminals being arranged in pairs in a vertical plane, switching members individual to each terminal pair but out of engagement therewith, a shaft vertically movable by force of gravity to select terminals of a certain trunk line, and axially movable to cause the switching members individual to the selected terminals to move into engagement therewith only when needed for transmitting energy thereover, and a solenoid controlled remotely for restoring the apparatus to normal position.

23. In an automatic remotely controlled switching apparatus, a plurality of terminals of trunk lines provided for the transmission of electric energy, said terminals being arranged in pairs in a vertical plane, switching members individual to each terminal pair but out of engagement therewith, a shaft vertically movable by force of gravity to select terminals of a certain trunk line, and axially movable to cause the switching members individual to the selected terminals to move into engagement therewith only when needed for transmitting energy thereover, and means automatically operative upon the cessation of current flow over the trunk line, for restoring the apparatus to normal position.

24. In an automatic remotely controlled switching apparatus, a plurality of terminals of trunk lines provided for the transmission of electric energy, said terminals being arranged in pairs in a vertical plane, switching members individual to each terminal pair but out of engagement therewith, a shaft vertically movable by force of gravity to select terminals of a certain trunk line, and axially movable to cause the switching members individual to the selected terminals to move into engagement therewith only when needed for transmitting energy thereover, and a solenoid automatically operative upon the cessation of current flow over the trunk line for restoring the apparatus to normal position.

25. In a switching mechanism, a series of contacts arranged in a single plane, said series including a pair of line contacts and a test contact representing a trunk line, line terminals for each pair of line contacts, a shaft carrying a test wiper, means for moving the shaft to cause the test wiper to engage said test contacts successively to select an idle trunk, and means on the shaft for then connecting the line terminals associated with the selected trunk with the line contacts of that trunk.

26. In a switching mechanism, a series of contacts arranged in a single plane, said contacts representing trunk lines, each trunk line comprising a test contact and a pair of line contacts, terminals for establishing connection with the line contacts, a shaft carrying a test wiper, means for moving the shaft to cause the test wiper to engage said test contacts successively to select an idle trunk line, and means for then connecting said terminals with the line contacts of the selected trunk line.

27. In an automatic switching mechanism, a plurality of sets of stationary terminals each set comprising one test conductor and two line conductors, two stationary line wipers arranged opposite said line terminals but normally out of engagement therewith, a test wiper, means for moving said test wiper to select a set of terminals, and separate means for then moving said first means to operate said line wipers to engage the line terminals corresponding to said test conductor engaged by said test wiper.

28. In an automatic switching mechanism, a plurality of sets of terminals each set comprising a test terminal and a plurality of line terminals, line wipers for engaging said line terminals and a test wiper for engaging said test terminals, means for moving said test wiper, without moving said line wipers, to select a set of said terminals, and means for then moving said line wipers, without moving said test wiper, to establish connection with the line terminals of the selected set.

29. In an automatic switching mechanism, a plurality of sets of terminals each set comprising a test terminal and a plurality of line terminals, line wipers for engaging said line terminals and a test wiper for engaging said test terminals, means for moving said test wiper, without moving said line wipers, to select a set of said terminals, means for then moving said line wipers, without moving said test wiper, to establish connection with the line terminals of said selected set, and means for locking said moving means in normal position and in operated position.

30. In an automatic switching mechanism, a plurality of sets of terminals each set comprising a test terminal and a plurality of line terminals, line wipers for engaging said line terminals and a test wiper for engaging said test terminals, means for moving said test wiper, without moving said line wipers, to select a set of said terminals, means for then moving said line wipers, without moving said test wiper, to establish connection with the line terminals of said selected set, the first of said movements being by gravitational force, and means for locking said moving means in normal position and in operated position.

In witness whereof, I hereunto subscribe my name this 3d day of August, A. D., 1925.

HANS SENGEBUSCH.